J. W. COBURN.
RUNNING GEAR FOR VEHICLES.
APPLICATION FILED FEB. 23, 1918.
1,320,739.
Patented Nov. 4, 1919.
2 SHEETS—SHEET 1.
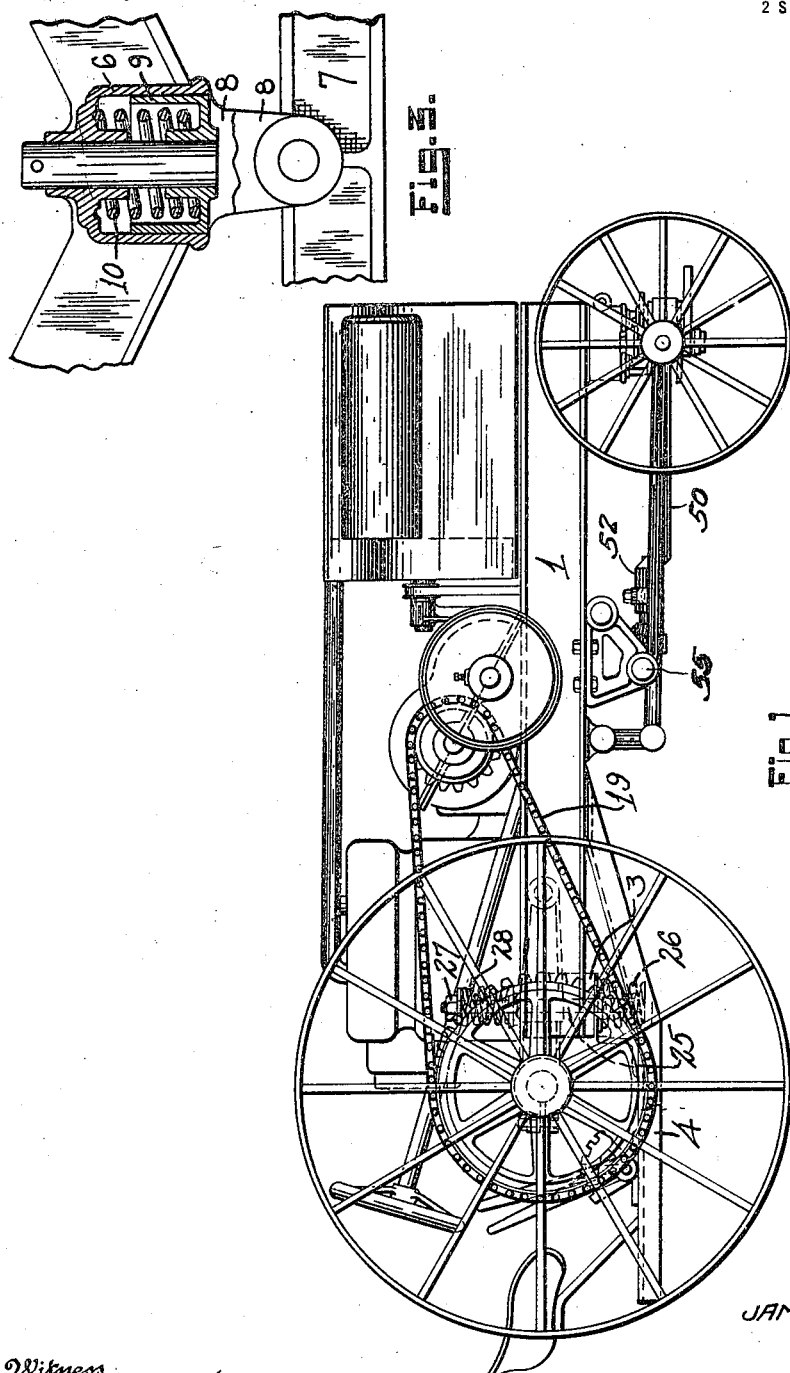
Inventor
JAMES W. COBURN

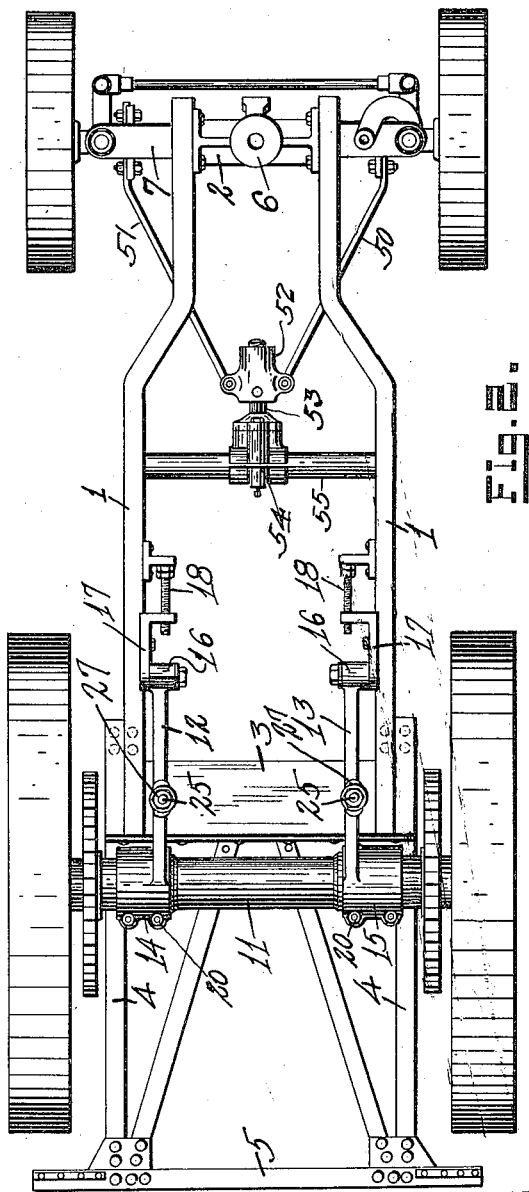

UNITED STATES PATENT OFFICE.

JAMES W. COBURN, OF HIGHLAND PARK, MICHIGAN.

RUNNING-GEAR FOR VEHICLES.

1,320,739.  Specification of Letters Patent.  Patented Nov. 4, 1919.

Application filed February 23, 1918. Serial No. 218,725.

*To all whom it may concern:*

Be it known that I, JAMES W. COBURN, a citizen of the United States, residing at Highland Park, county of Wayne, State of Michigan, have invented a certain new and useful Improvement in Running-Gears for Vehicles, and declare the following to be a full, clear, and exact description of the same, such as will enable others skilled in the art to which it pertains to make and use the same, reference being had to the accompanying drawings, which form a part of this specification.

This invention relates to running gear for vehicles, and its object is to provide a running gear and mounting for the frame or body of the vehicle relative thereto in such manner that the frame or body is spring-supported at three pivotal points, one upon the front axle and two on the rear axle. The purpose of the particular pivotal spring suspension of the frame is to allow oscillation of the axles transversely of the frame member without communicating to the frame the said vibrations and preventing a torsion or twist of the frame longitudinally or about a longitudinal axis as with the usual four-point suspension of vehicle frames commonly in use. These general objects of the invention are accomplished by the construction illustrated in the accompanying drawings in which—

Figure 1 is a side elevation of a tractor showing my improved frame suspension relative to the axles.

Fig. 2 is a plan view thereof showing the vehicle frame and running gear only.

Fig. 3 is a detail showing the pivotal connection of the frame with the front axle.

In the drawings 1 indicates the side members of the frame which, at the convergent forward ends are connected by a cross member 2, and just forward of the rear axle are connected by the cross members 3. The frame members 1 in the construction shown terminate just forward of the rear axle and connected with the said ends of the frame and extending beneath the axles are the auxiliary side frames 4 which connect with a cross member 5 at the back and providing frame work for supporting the operator's platform at the rear of the vehicle as will be understood from Fig. 1. The cross member 2 at the forward end of the frame is provided at the center with a cylindrical cup member 6 as shown particularly in Fig. 3, and pivotally connected at the center of the front axle 7 is a yoke member 8 terminating in a cylindrical member 9 telescopic relative to the cylindrical member 6. A coil spring 10 is interposed between the two telescoping members adapted to take up the shock incident to inequalities of the road and as will be noted in Fig. 3 the yoke member 8 is pivoted centrally of the axle on a pivot extending along the longitudinal center of the framework allowing the axle to oscillate in a vertical plane transversely of the frame member.

Evidently, in the construction shown for steering the vehicle, the front axle should be prevented from turning in a horizontal plane. For this purpose, two radius rods 50 and 51 are provided, each having an end connected to the axle near each steering fork and converging at the rear end and there connected with an apertured block 52. This block is apertured to receive a stem 53 and is adjustably secured thereon by the threading of the stem and the block as will be readily understood. This stem is provided with a ball at the end fitting in a socket in a block 54 secured to a member 55 of the frame, the preferred construction being more specifically shown in my co-pending application, Serial No. 218,978, filed Feb. 25, 1918. This connection of the axle with the frame member—that is through the pivoted yoke at the forward end and ball and socket connection of the radius rods at the rear thereof on the longitudinal axis of the frame, holds the axle rigidly from movement in a horizontal plane and allows free movement of the axle in a vertical plane.

The rear axle is inclosed in a tubular casing 11 shown more clearly in Fig. 1 and radius rods 12 and 13 are each connected with the said tubular member near the opposite ends by means of a split bearing member 14 and 15 respectively. The forward ends of the radius rods are pivotally connected at 16 with a block 17 movable longitudinally of the framework by means of a threaded bolt 18 as shown in Fig. 1 extending through a projecting portion of the block 17, a purpose of which arrangement is to enable a chain member 19 to be adjusted to take up slack as shown in Fig. 1. By means of the cap nuts 20 the bearing members 14 and 15 may be tightly clasped about the tubular member 11, and the pivotal points 16 of the radius bars allows the axle member to vibrate in a vertical plane without transmitting the movement to the main frames 1. As shown partly by dotted lines in Fig. 1, each radius rod is apertured to receive a vertical shaft 25. This shaft extends through the cross member 3 of the frame and is provided with a head at the lower end and between the said head and the lower face of the cross bar is interposed a spring 26. The shaft extends upward through the radius rod and is provided with a flanged nut 27 or the like providing a head between which and the upper face of the radius rod is interposed a spring 28. The spring 26 is preferably of considerably greater strength than the spring 28. The spring 28 is adapted to take up rebound while the spring 26 absorbs the ordinary road shocks. By the arrangement described the rear axle is thus pivotally connected with the framework, and the frame is spring-supported relative to the axle and thus the mode of support of the frame on both axles is such that the frame is in pivotal relation and spring-supported upon both axles and the axles are thus able to assume various positions due to the inequality of the road surface while allowing the frame to assume the horizontal position, or practically horizontal position at all times which is the primary object of this invention.

Having thus briefly described my invention, what I claim and desire to secure by Letters Patent of the United States is—

1. In a vehicle, a frame spring-supported at three pivotal points—namely, a single forward point at the center of the front axle and the two rear points relative to the rear axle, the forward point of support being adapted to allow oscillation of the axle in a vertical plane, and means for preventing movement of the front axle in a horizontal plane consisting of radius rods, each having an end rigidly connected to the axle near the respective ends, a universal joint at the center of the framework between the said axles, a member connected to the universal joint and movable longitudinally relative thereto, the two radius rods connected with the front axle converging and being attached to the said adjustable member.

2. In a vehicle, a framework, a front axle, a rear axle, means for spring supporting the framework on the front axle to allow oscillation of the axle in a vertical plane transversely of the framework, a threaded stem connected with the joint, a block in threaded relation with the stem, a pair of radius rods each having a rigid connection with an end of the front axle, the radius rods converging and having the opposite ends thereof connected with the block, and a radius rod pivotally connected to each side frame near the rear end and secured to the rear axle near each end thereof respectively, the frame being spring-supported on the radius rods.

In testimony whereof I sign this specification.

JAMES W. COBURN.

Copies of this patent may be obtained for five cents each, by addressing the "Commissioner of Patents, Washington, D. C."